(No Model.) 3 Sheets—Sheet 1.
C. H. SMITH.
GLASS BENDING AND ANNEALING FURNACE.
No. 373,695. Patented Nov. 22, 1887.
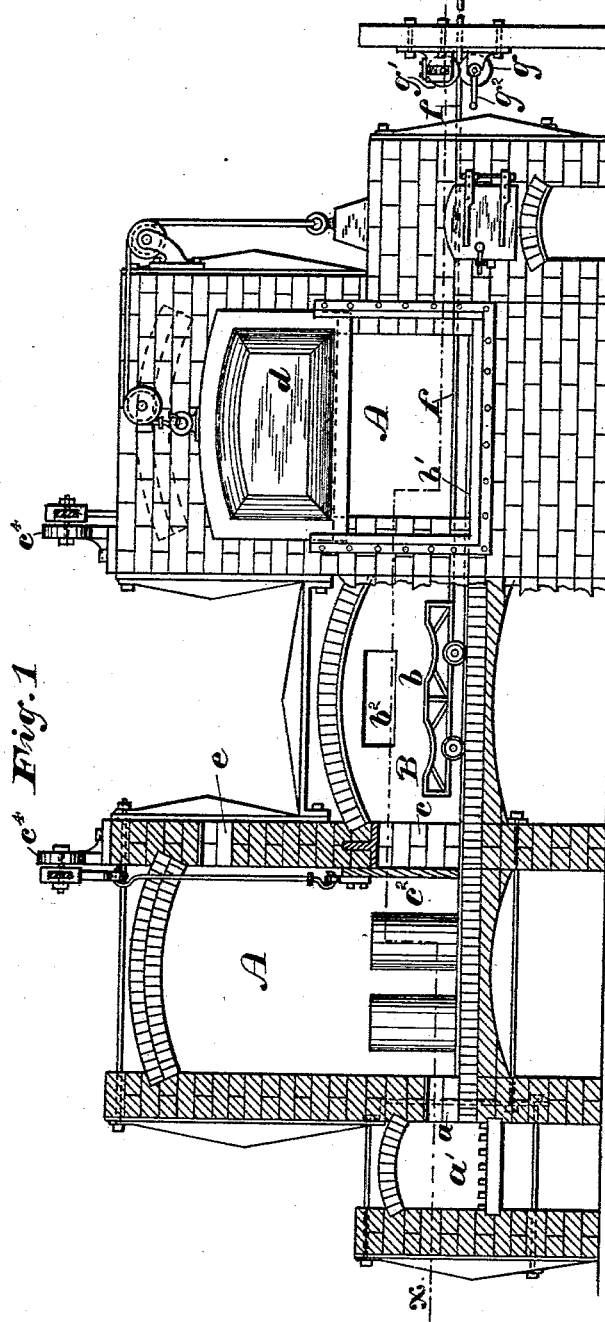
WITNESSES:
INVENTOR
Charles H. Smith
BY Campbell & Co. ATT'YS.

(No Model.) 3 Sheets—Sheet 2.
C. H. SMITH.
GLASS BENDING AND ANNEALING FURNACE.
No. 373,695. Patented Nov. 22, 1887.
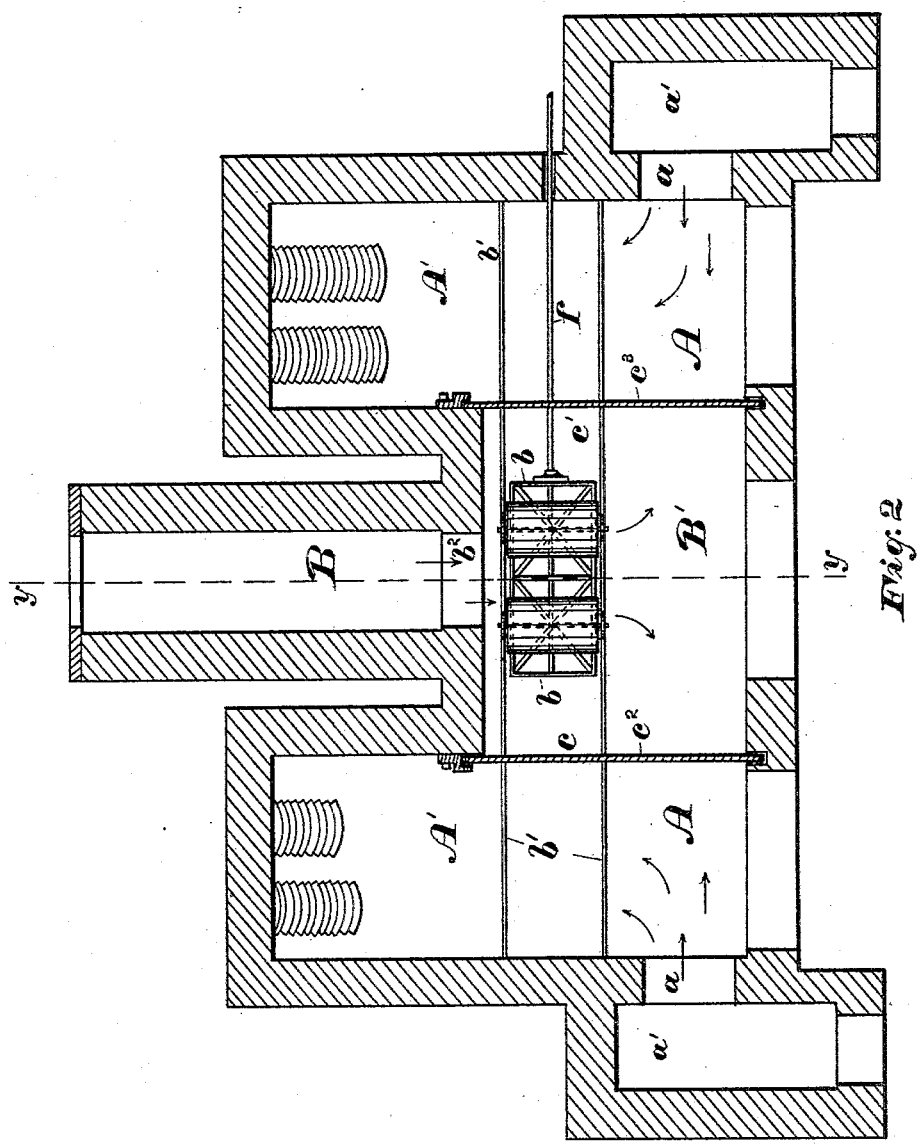
WITNESSES:
INVENTOR
Charles H. Smith
BY ____ ATT'YS.

(No Model.) 3 Sheets—Sheet 3.
C. H. SMITH.
GLASS BENDING AND ANNEALING FURNACE.
No. 373,695. Patented Nov. 22, 1887.
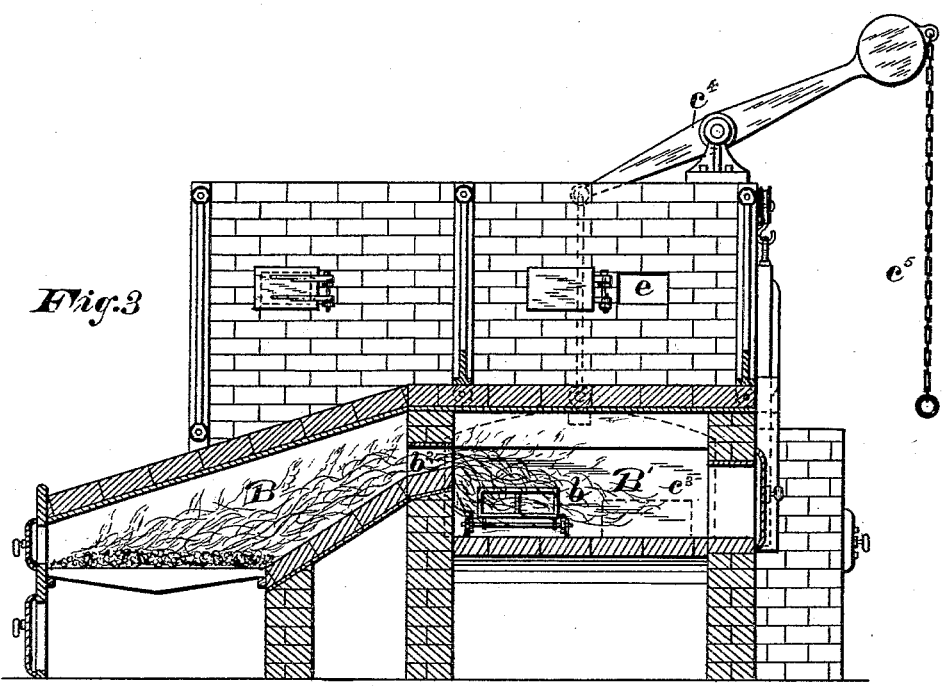
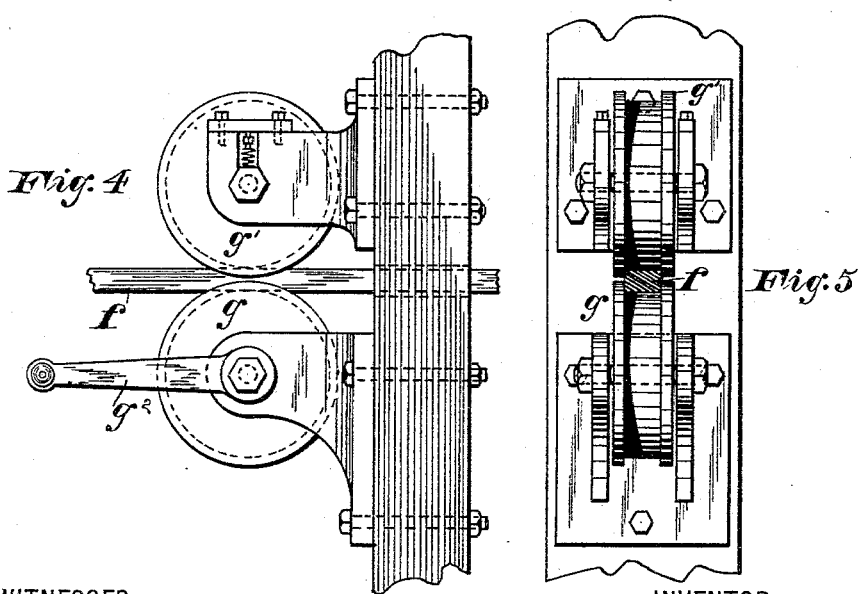
WITNESSES:
J. H. Bartine
Wm. E. Blunett.
INVENTOR
Charles H. Smith
BY Campbell & ATT'YS.

UNITED STATES PATENT OFFICE.

CHARLES H. SMITH, OF NEWARK, NEW JERSEY.

GLASS BENDING AND ANNEALING FURNACE.

SPECIFICATION forming part of Letters Patent No. 373,695, dated November 22, 1887.

Application filed November 23, 1886. Serial No. 219,653. (No model.)

*To all whom it may concern:*

Be it known that I, CHARLES H. SMITH, a citizen of the United States, residing at Newark, in the county of Essex and State of New Jersey, have invented certain new and useful Improvements in Glass Bending and Annealing Furnaces; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The invention herein set forth relates to improvements in glass bending and annealing furnaces, and is so constructed and designed that the heat and flames are so directed and controlled that they most effectively act upon the glass both in the bending and annealing processes; also, more perfect annealing of the glass is had without any liability of loss from the cracking of the glass or in handling the same.

The improved furnaces are further designed by the arrangement thereof to permit the rapid and ready handling of the glass in transferring the same from the bending-furnace to the leers.

In the accompanying three sheets of drawings, Figure 1 is a front elevation of the improved combined bending and annealing furnaces, a portion of the bending-furnace and one leer being broken away to show the interior thereof; and Fig. 2 is a horizontal section of the furnace and leers, taken on the line $x$, Fig. 1. Fig. 3, Sheet 3, is a vertical section of the bending-furnace through line $y$, Fig. 2. Fig. 4 is a side elevation of the device for operating the trucks, and Fig. 5 is a front elevation of the said device and section of the drawing-rod.

Similar reference-letters are employed to indicate like parts in each of said views.

In handling glass during the annealing process, as is well known, the utmost care is required to prevent the cracking of the glass by subjecting the same to any sudden change of temperature, and this is especially true in annealing bent glass, which is the purpose of the improved furnace and leers. By the improved arrangement and construction of the furnaces as set forth hereinafter this difficulty is avoided and better results secured.

As indicated in the drawings, the bending-furnace is centrally disposed with the leers A, on opposite sides thereof, as in Fig. 2, and is composed of the furnace proper, B, and the bending-chamber B′, in which the glass to be treated is arranged upon suitable trucks, $b$, to which run upon the track or tracks $b'$.

The furnace is entirely cut off from the bending-chamber, except through an opening, $b^2$, in the partition or wall between said furnace and chamber, and placed, preferably, just above the truck. Through said opening the flames and heat from the fire escape into the bending-chamber over and around the glass, as indicated in Fig. 3.

The leers and bending-chamber communicate with one another by means of the openings $c\ c'$, which are closed during the bending process by dampers $c^2\ c^3$, as in Figs. 1 and 2; and extending through said openings into both leers and through the bending-chamber are one or more tracks, $b'$, upon which the trucks run through the leers and bending-chamber.

The dampers $c^2\ c^3$ are so constructed and arranged as to be raised and lowered, as desired, moving in grooved ways, as indicated in Fig. 2, and connected with weighted levers $c^4$ by suitable rods. (Shown in Figs. 1 and 3.) The weighted levers are operated by chains $c^5$, Fig. 3.

The leers, as above stated, are arranged on opposite sides of the bending furnace and chamber, and consist of two portions, the front portion, A, into which the tracks extend, and the rear portion, A′, in which the bent glass is placed and allowed to stand until properly annealed, accumulating therein until the full capacity of the furnace is reached.

Communicating with each portion A of the annealing-chambers, through the openings $a$, are furnaces $a'$, which give out sufficient heat to maintain the proper temperature of the glass after leaving the bending-chamber.

The glass is subjected to a high degree of heat in the bending-chamber, in order to conform the same to the molds, the dampers $c^2\ c^3$ shutting off the leers from the bending-chamber and retaining the extreme heat in said chamber, which, if allowed to escape into the leers, would prevent the proper annealing of the glass. By providing separate furnaces for each of the leers and the bending-chamber, the amount of heat can be regulated and the temperature in each may be increased and diminished independent of the others.

The arrangement of the fire-opening $b^2$ from the bending-furnace in the dividing-wall above the bending-truck, as shown in Figs. 1 and 3, secures the most effective action of the flames upon the glass; and I have found by experience that a much greater quantity of glass can be bent by this method of introducing the flames than by those methods heretofore employed.

In Figs. 1, 2, 3, and 4 is illustrated one form of mechanism for moving the trucks from one chamber to another without opening the front doors and pushing the trucks along the track by means of long rods or poles inserted through the front openings, as has been done heretofore. The opening of the front doors reduces the temperature of the bending-chamber and leers, owing to the escape of heat, and, what is more serious, subjects the glass to sudden changes of temperature. This is avoided by means of the devices herein specified for moving the truck, which consists of a rod, $f$, of sufficient length to extend the entire length of the three chambers and out through the walls on either side, as indicated in Fig. 2, and passes between clamping-rollers $g\,g'$, journaled in a suitable standard. One of said rollers, as $g$, is provided with a crank, $g^2$, or other mechanism, for operating the same, the other roller being provided with an adjusting-screw and spring, whereby the pressure thereof upon the rod may be regulated. Thus it will be seen that by the use of this apparatus the truck can readily and rapidly be moved from one chamber to another.

In bending glass in the combined furnaces the plates of glass are laid in the bending-molds, which are placed on the trucks in the bending-chamber and the said chamber cut off from communication with the leers by lowering the dampers. After remaining within the bending-chamber a short time, the bent glass is wheeled into the front portion, A, of the leers, after raising the dampers, and is then removed from the truck and placed in the back portion, A', of the leer, as indicated in Fig. 2. In this manner the glass is carried through several chambers of varying temperatures—from the highly-heated bending-chamber through the moderately-heated portion A of the leers and into the comparatively-cool portion A'—suffering no sudden decrease in temperature in the several changes. As will be understood, either one or both of the leers may be used in connection with the bending-furnace, according to the working capacity desired. Should it be desirable, the portions A and A' of the leers may be separated one from the other by a suitable damper, which may be opened and closed.

I am aware of American Patents Nos. 184,379 and 229,976, and hereby disclaim anything disclosed in my application which is not novel in view of those patents.

Having thus described my invention, I desire to claim the following:

A glass bending and annealing furnace, consisting of a central bending-chamber having a fire-hole in the back thereof and above the floor and an opening in the front through which the glass is inserted into said chamber, a furnace back of said chamber and opening into the same through the fire-hole therein, annealing-leers on each side of said bending-chamber and communicating therewith through openings $c\,c'$, closed by adjustable dampers, said leers extending backward from the said openings $c\,c'$ and provided with openings in the front thereof, furnaces $a$, opening into the front of each leer through fire-holes $a'$, and a track extending through the central bending-chamber and the front part of each leer, substantially as and for the purposes set forth.

In testimony that I claim the invention set forth above I have hereunto set my hand this 9th day of November, 1886.

CHARLES H. SMITH.

Witnesses:
FREDK. F. CAMPBELL,
FREDK. C. FRAENTZEL.